United States Patent
Chuang (10) Patent No.: US 7,575,245 B2
(45) Date of Patent: Aug. 18, 2009

(54) DEVICE FOR CONNECTING A KICKSTAND TO A BICYCLE

(76) Inventor: Louis Chuang, 8th Floor-4, No. 20, Ta Lon Road, Taichung (TW)

( * ) Notice: Subject to any disclaimer, the term of this patent is extended or adjusted under 35 U.S.C. 154(b) by 268 days.

(21) Appl. No.: 11/612,633

(22) Filed: Dec. 19, 2006

(65) Prior Publication Data

US 2008/0143074 A1    Jun. 19, 2008

(51) Int. Cl.
*B62H 1/00* (2006.01)
(52) U.S. Cl. .................................... 280/301
(58) Field of Classification Search ............ 280/301, 280/293, 298
See application file for complete search history.

(56) References Cited

U.S. PATENT DOCUMENTS

| | | | | |
|---|---|---|---|---|
| 1,744,417 A | * | 1/1930 | Schwartz | 280/7.11 |
| 1,799,573 A | * | 4/1931 | Thomas | 280/301 |
| 2,018,531 A | * | 10/1935 | Pawsat | 280/301 |
| 2,414,903 A | * | 1/1947 | Schultz | 280/301 |
| 3,807,215 A | * | 4/1974 | Olsen et al. | 72/405.14 |
| 4,563,016 A | * | 1/1986 | Holleron, Jr. | 280/293 |
| 6,955,371 B2 | * | 10/2005 | French | 280/279 |
| 7,059,622 B2 | * | 6/2006 | Chuang | 280/293 |
| 7,278,344 B2 | * | 10/2007 | Pryor et al. | 83/272 |
| 7,290,977 B2 | * | 11/2007 | Albright et al. | 414/723 |

OTHER PUBLICATIONS

Taiwanese Patent Publication No. 226133, Jul. 10, 1994, 2 pages.
Taiwanese Patent Publication No. 236976, Dec. 21, 1994, 4 pages.

* cited by examiner

*Primary Examiner*—Tony H. Winner
(74) *Attorney, Agent, or Firm*—Alan Kamrath; Kamrath & Associates PA (57) ABSTRACT

A device for connecting a kickstand to a bicycle includes a first connective member, a second connective member and a fastener. The first connective member is connected to a chain stay and a seat stay. The first connective member includes a claw formed thereon for holding a shaft of a rear wheel and a cavity defined therein. The kickstand is pivotally connected to the second connective member. The second connective member includes a block fit in the cavity so that the first and second connective members cannot be rotated with respect to each other. The fastener is used for fastening the first and second connective members to each other.

8 Claims, 9 Drawing Sheets

Fig. 9

DEVICE FOR CONNECTING A KICKSTAND TO A BICYCLE

BACKGROUND OF INVENTION

1. Field of Invention

The present invention relates to a bicycle and, more particularly, to a device for connecting a kickstand to a bicycle.

2. Related Prior Art

Disclosed in Taiwanese Patent Publication No. 226133 is a device for connecting a kickstand 5 to a bicycle. The device includes plates 2 and 3, a hooking element 9, two threaded bolts and two nuts. The kickstand 5 is pivotally connected to the plate 3. A chain stay 4 is sandwiched between the plates 2 and 3. The hooking element 9 includes a U-shaped body and two hooks 91 extending from the U-shaped body. A seat stay 4A is hooked by the hooks 91 of the hooking element 9. The U-shaped body of the hooking element 9 is sandwiched between the plates 2 and 3. The nuts are engaged with the threaded bolts that are inserted through the plates 2 and 3. The U-shaped body of the hooking element 9 is provided around one of the threaded bolts. Thus, the kickstand 5 is connected to the bicycle by the device. This process is, however, troublesome. Furthermore, the connection of the kickstand 5 to the bicycle is not firm. Moreover, the device is not aesthetically pleasing.

Disclosed in Taiwanese Patent Publication No. 236976 is a device for connecting a kickstand 12 to a bicycle. The device includes plates 11 and 19, three threaded bolts 23 and three nuts 24. The kickstand 12 is pivotally connected to the plate 11. The plate 11 includes an arched portion 16 and an aperture 17 defined in a bent end. The plate 19 includes an arched portion 21 and a hook 20 at an end. A chain stay is sandwiched between the arched portions 16 and 21. A seat stay 30 is sandwiched between the plates 11 and 19. The hook 20 is inserted through the aperture 17. The nuts 24 are engaged with the threaded bolts 23 that are inserted through the plates 11 and 19. Thus, the kickstand 12 is connected to the bicycle by the device. This process is, however, troublesome. Furthermore, the connection is not firm. Moreover, the device is not aesthetically pleasing.

The present invention is therefore intended to obviate or at least alleviate the problems encountered in the prior art.

SUMMARY OF INVENTION

According to the present invention, a device is disclosed for connecting a kickstand to a bicycle. The device includes a first connective member, a second connective member and a fastener. The first connective member is connected to a chain stay and a seat stay. The first connective member includes a claw formed thereon for holding a shaft of a rear wheel and a cavity defined therein. The kickstand is pivotally connected to the second connective member. The second connective member includes a block fit in the cavity so that the first and second connective members cannot be rotated with respect to each other. The fastener is used for fastening the first and second connective members to each other.

The primary advantage of the device according to the present invention is firm interconnection of the first and second connective members because the block is fit in the cavity.

Other advantages and features of the present invention will become apparent from the following description referring to the drawings.

BRIEF DESCRIPTION OF DRAWINGS

The present invention will be described through detailed illustration of two embodiments referring to the drawings.

DETAILED DESCRIPTION OF EMBODIMENTS

Figure 1:
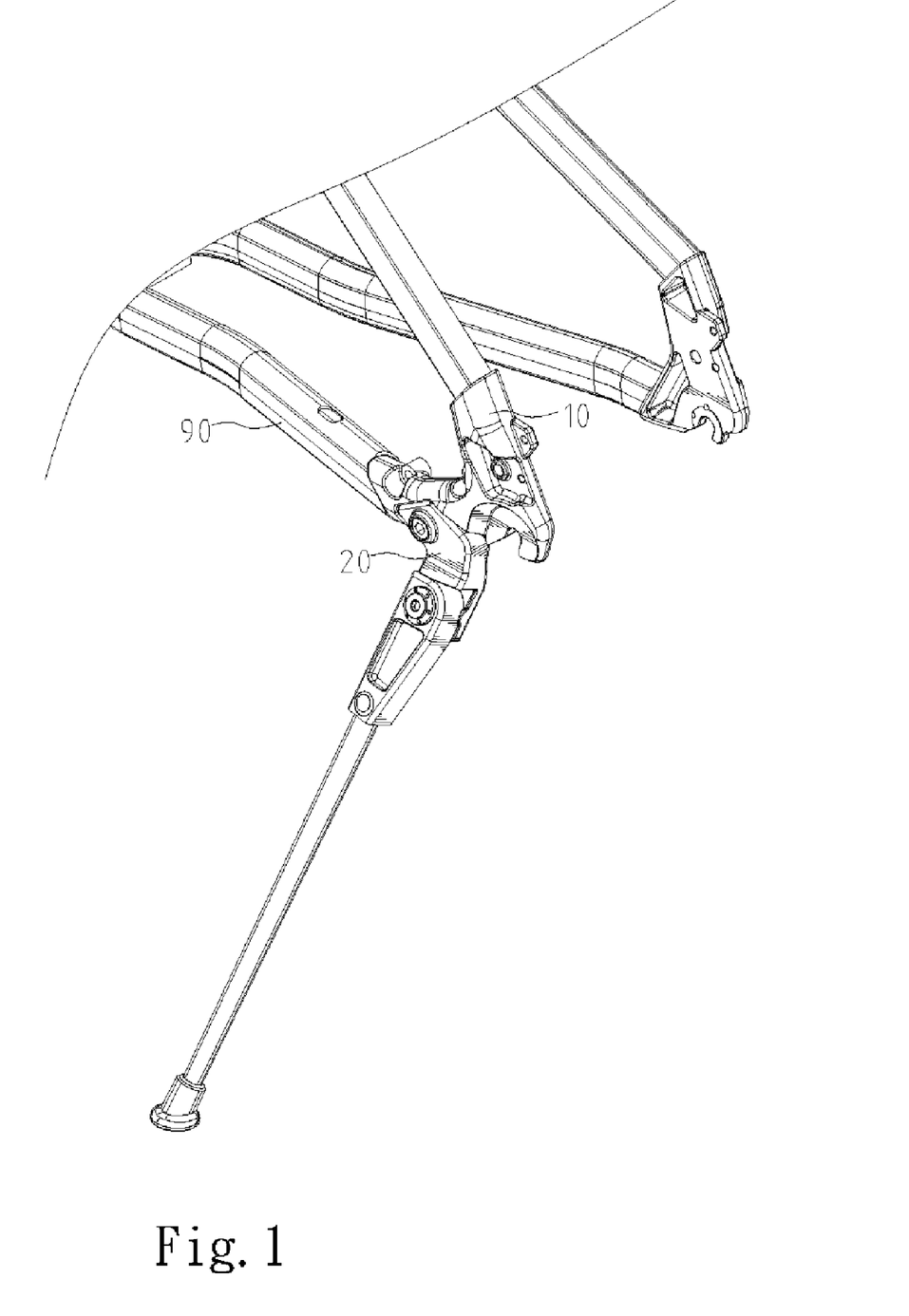
FIG. 1 is a perspective view of a device for connecting a kickstand to a bicycle according to the first embodiment of the present invention.

Referring to FIG. 1, there is shown a device for connecting a kickstand 21 (FIG. 2) to a bicycle according to a first embodiment of the present invention. The device includes a first connective member 10 and a second connective member 20 connected to the first connective member 20. The first connective member 10 is connected to a chain stay 90 and a seat stay. The kickstand 21 is pivotally connected to the second connective member 20.

Figure 2:
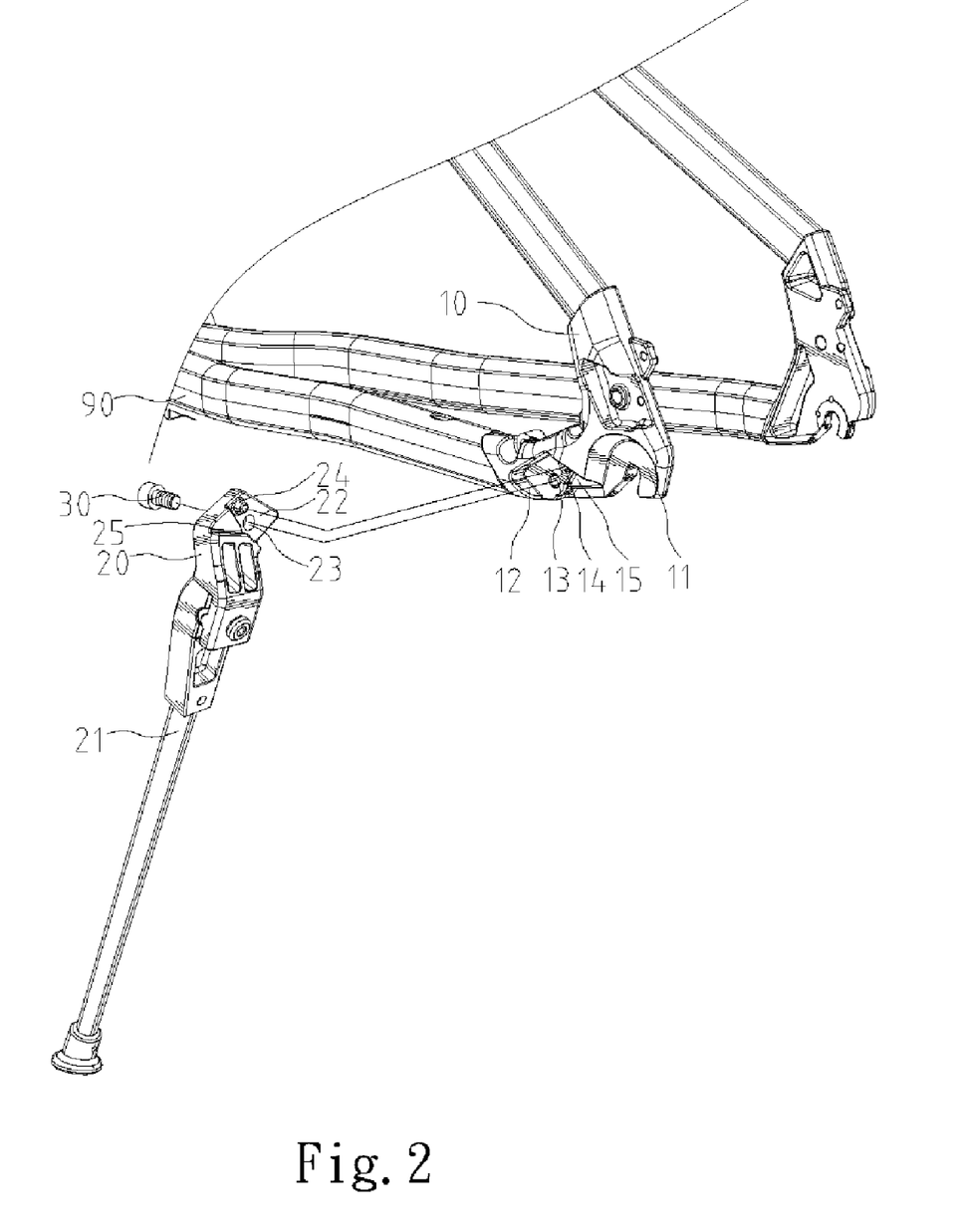
FIG. 2 is an exploded view of the device shown in FIG. 1.

Referring to FIG. 2, the first connective member 10 is made of a bent form with a first end connected to the chain stay 90, a second end connected to the seat stay and a claw 11 formed between the first and second ends for holding a shaft of a rear wheel. The first connective member 10 is made with a first side and a second side located further from the rear wheel than the first side. The first connective member 10 includes a cavity 12 defined in the second side, a screw hole 13 defined in the floor of the cavity 12, a recess 14 defined in the floor of the cavity 12 and a stepped portion 15.

The second connective member 20 includes a block 22 formed thereon, an aperture 23 defined in a first side of the block 22, a boss 24 formed on the first side of the block 22 and a stepped portion 25 formed on the first side of the block 22.

Figure 3:
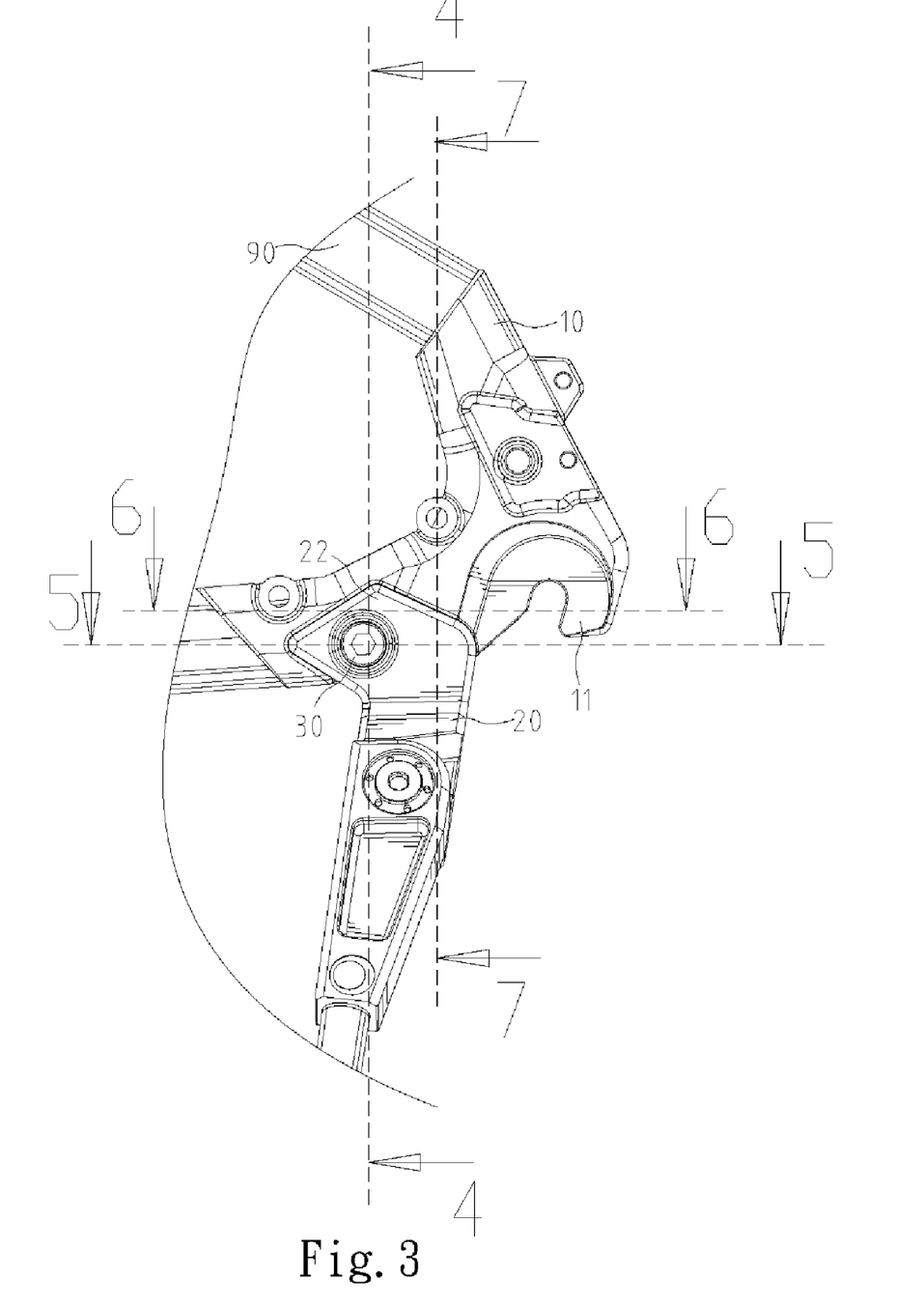
FIG. 3 is a right side view of the device shown in FIG. 1.

Referring to FIG. 3, the block 22 is located in the cavity 12. The block 22 is made complementary to the cavity 12. The periphery of the block 22 is in contact with the wall of the cavity 12. Thus, the block 22 cannot be rotated in the cavity 12.

Figure 4:
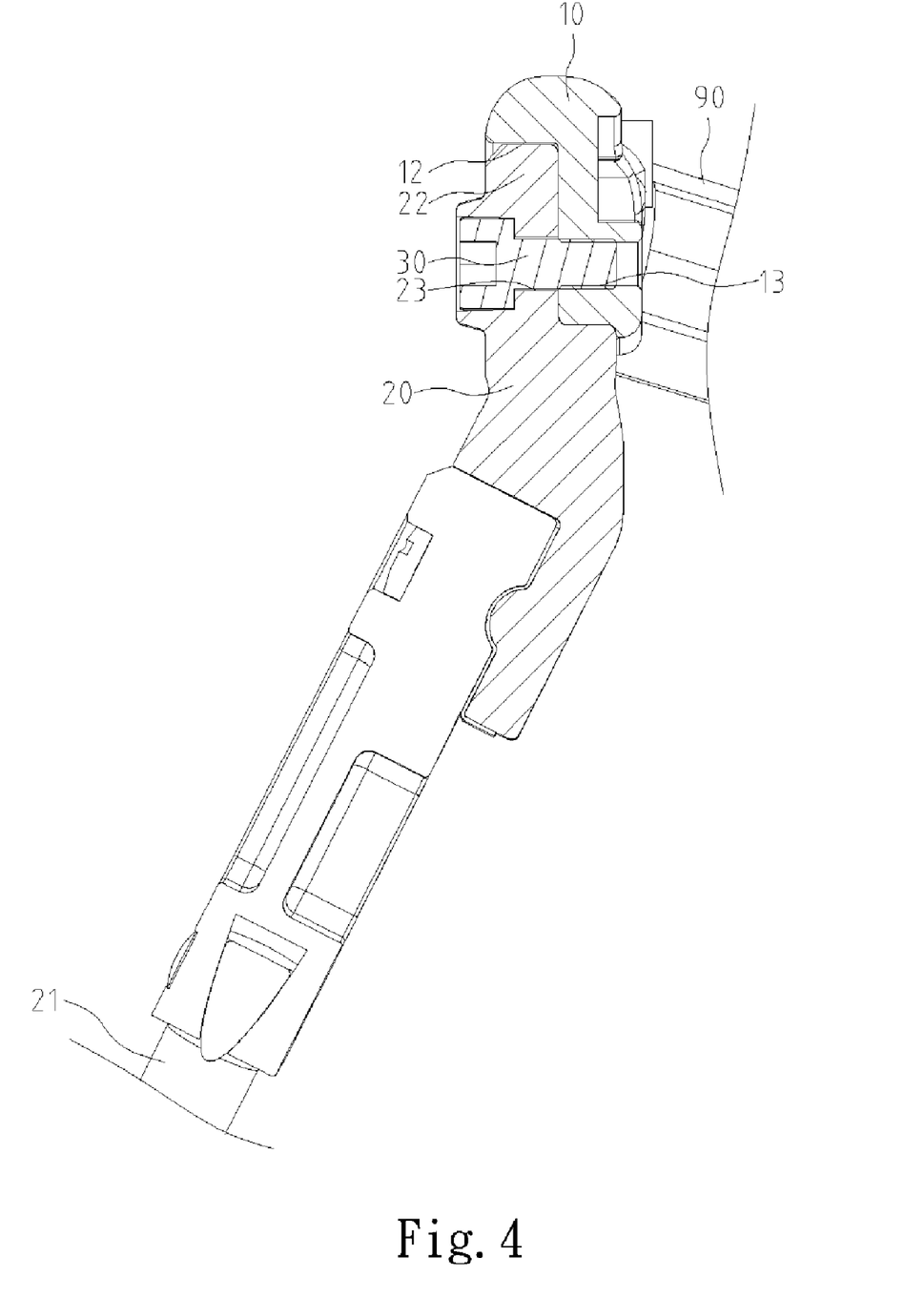
FIG. 4 is a cross-sectional view of the device taken along a line 4-4 shown in FIG. 3.
Figure 5:
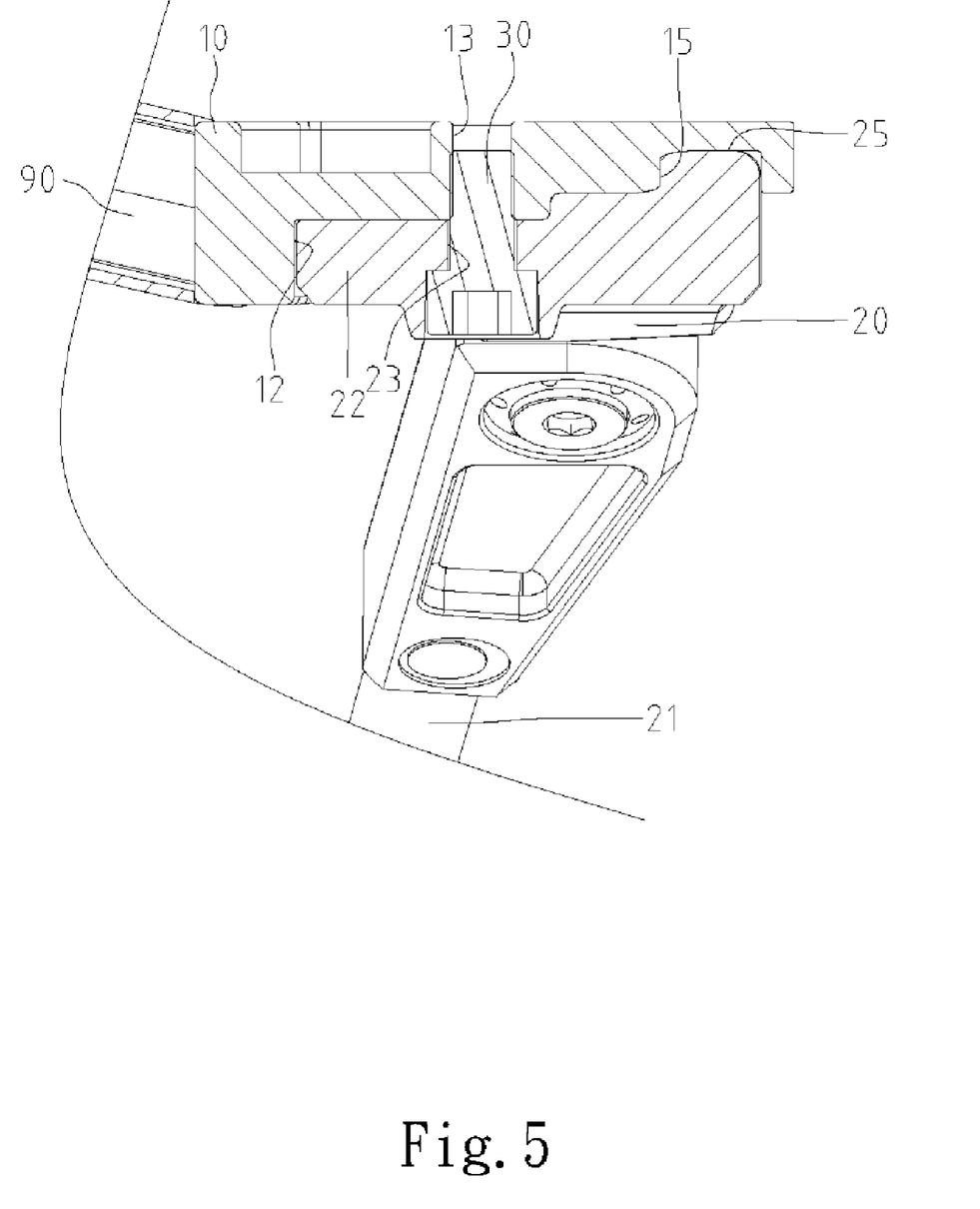
FIG. 5 is a cross-sectional view of the device taken along a line 5-5 shown in FIG. 3.
Figure 6:
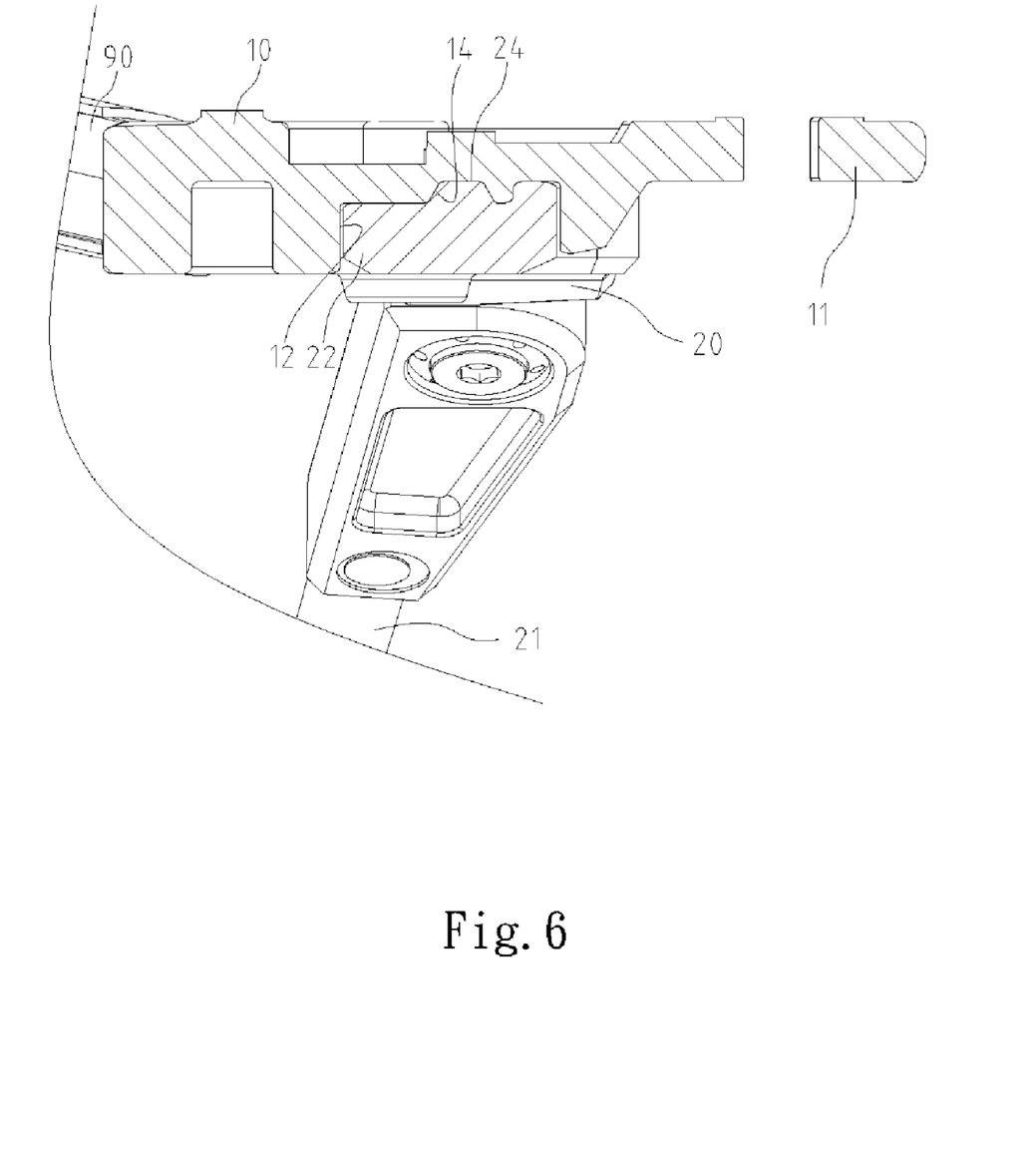
FIG. 6 is a cross-sectional view of the device taken along a line 6-6 shown in FIG. 3.
Figure 7:
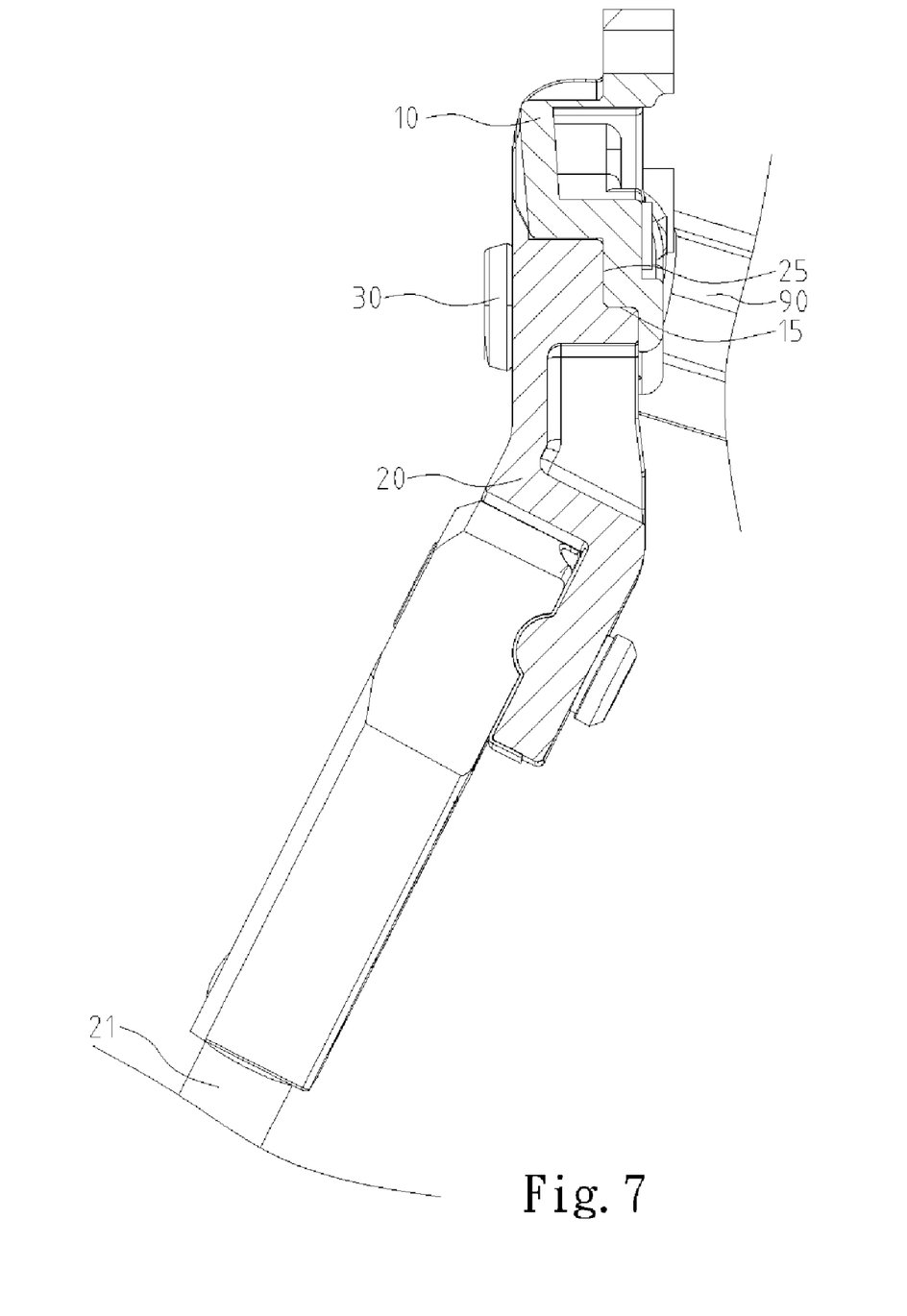
FIG. 7 is a cross-sectional view of the device taken along a line 7-7 shown in FIG. 3.

Referring to FIG. 4, a threaded bolt 30 is driven into the screw hole 13 through the aperture 23. Referring to FIGS. 5 and 7, the stepped portions 25 and 15 are in contact with each other. Referring to FIG. 6, the boss 24 is located in the recess 14. Thus, the second connective member 20 is secured to the first connective member 10. The second side of the block 22 is flush with the second side of the first connective element 10.

Figure 8:
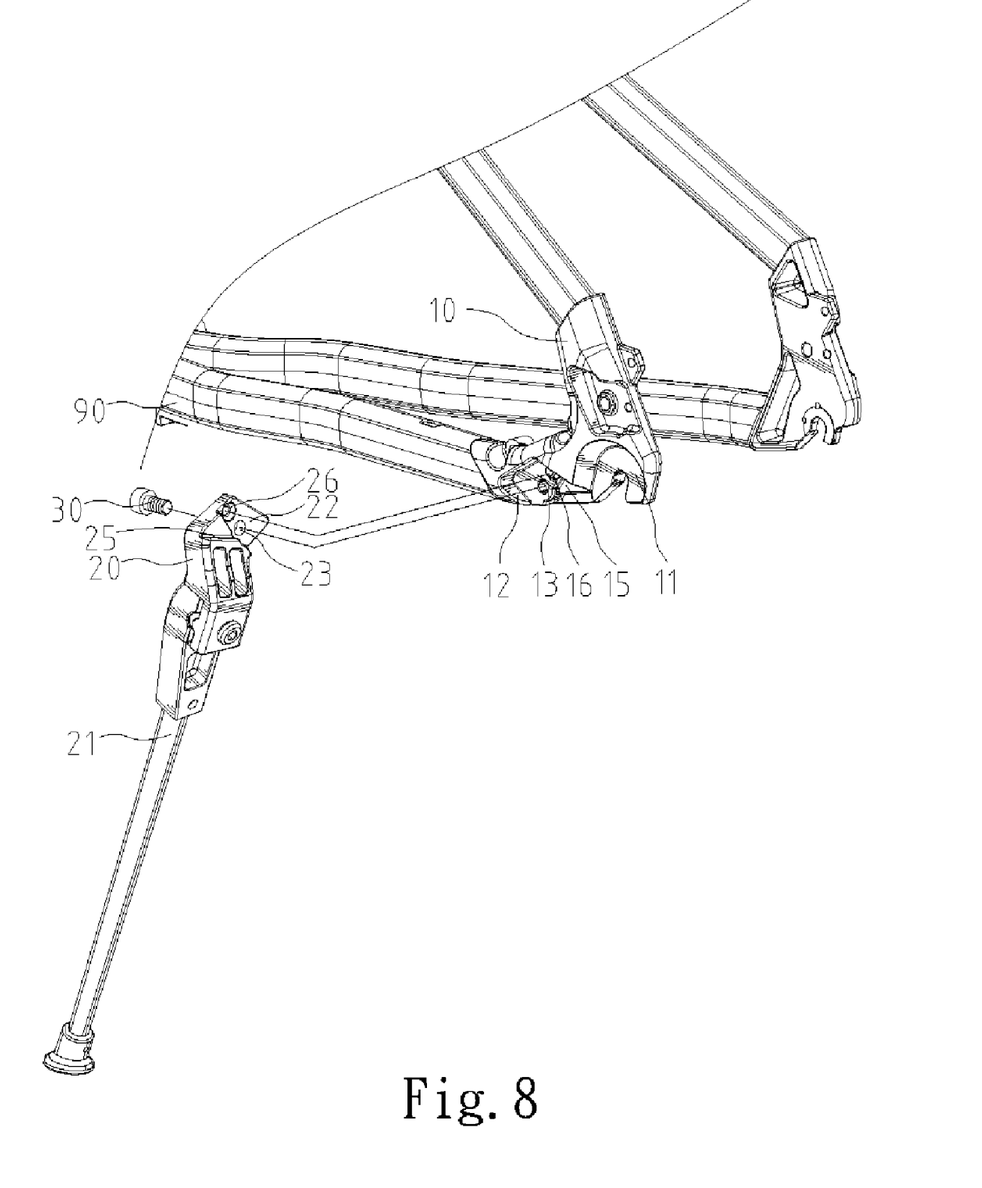
FIG. 8 is an exploded view of a device for connecting a kickstand to a bicycle according to the second embodiment of the present invention.
Figure 9:
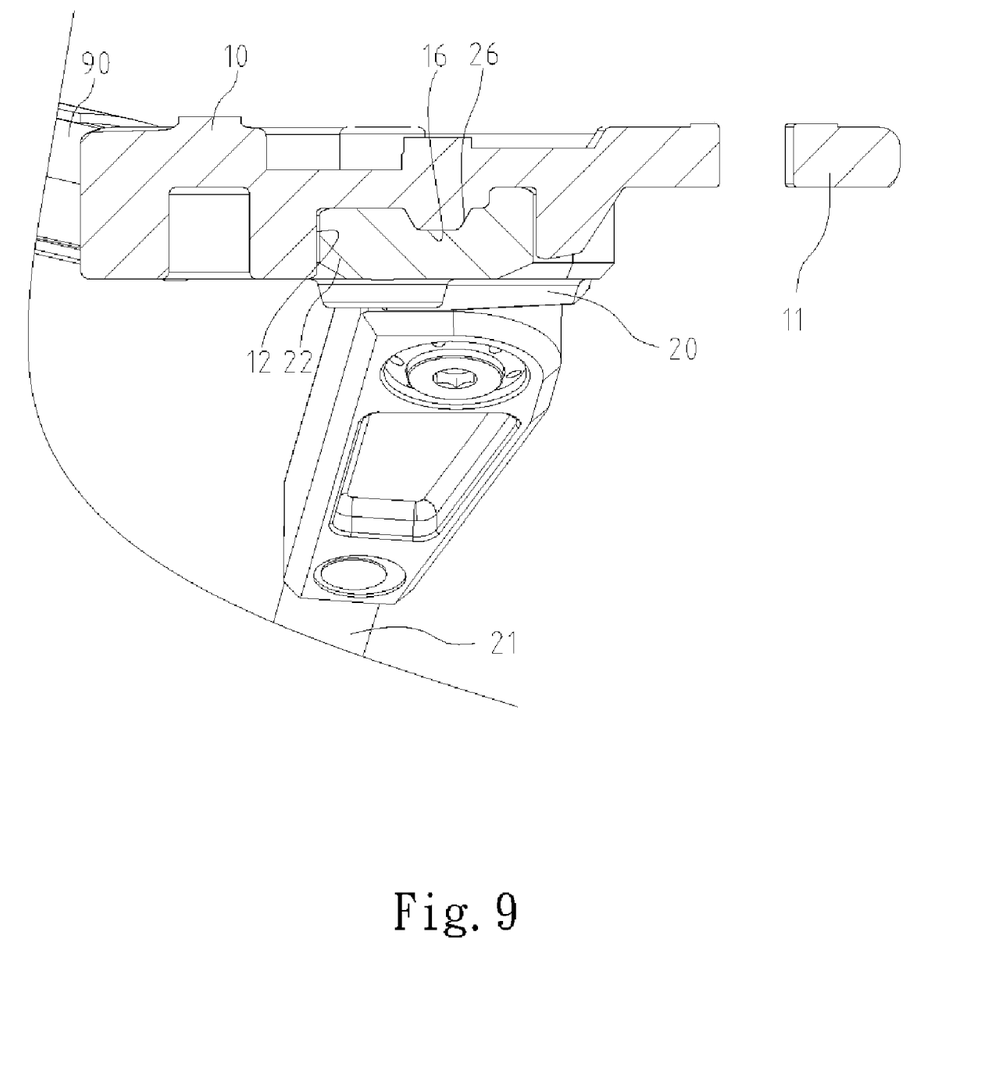
FIG. 9 is a cross-sectional view of the device shown in FIG. 8.

Referring to FIG. 8, there is shown a device for connecting a kickstand 21 to a bicycle according to a second embodiment of the present invention. The second embodiment is like the first embodiment except two things. Firstly, the first connective member 10 includes a boss 16 formed on the floor of the cavity 12 instead of the recess 14 defined in the floor of the cavity 12. Secondly, the second connective member 20 includes a recess 26 defined in the first side of the block 22 instead of the boss 24 formed on the first side of the block 22. Referring to FIG. 9, the boss 16 is disposed in the recess 26.

The device of the present invention exhibits advantages as follows:

Firstly, the interconnection of the first and second connective members is firm, because the periphery of the block 22 is in contact with the wall of the cavity 12.

Secondly, the support of the kickstand 21 is strong, since the stepped portions 25 and 15 are in contact with each other.

Thirdly, the device is aesthetically pleasing, because the second side of the block 22 is flush with the second side of the first connective element 10.

The present invention has been described through the illustration of the preferred embodiments. Those skilled in the art can derive variations from the preferred embodiments without departing from the scope of the present invention. Therefore, the preferred embodiments shall not limit the scope of the present invention defined in the claims.

What is claimed is:

1. A device for connecting a kickstand to a bicycle, the device comprising:
    a first connective member connected to a chain stay and a seat stay, with the first connective member comprising a claw for holding a shaft of a rear wheel and a cavity, with the first connective member including a first side and a second side located further from the rear wheel than the first side, with the cavity defined in the second side spaced from the claw;
    a second connective member pivotally connected to the kickstand and formed with a block fit in the cavity so that the first and second connective members cannot be rotated with respect to each other; and
    a fastener fastening the first and second connective members to each other, with the fastener being spaced from the claw and the shaft of the rear wheel.

2. The device according to claim 1 wherein the fastener is a threaded bolt.

3. The device according to claim 2 wherein the first connective member defines a screw hole threadably receiving the threaded bolt.

4. The device according to claim 3 wherein the second connective member defines an aperture through which the threaded bolt is inserted.

5. The device according to claim 1 wherein the first connective member comprises a stepped portion formed on a floor of the cavity, and the second connective member comprises a stepped portion engaged with the stepped portion of the first connective member.

6. The device according to claim 1 wherein the first connective member defines a recess in a floor of the cavity, and the second connective member comprises a boss disposed in the recess.

7. The device according to claim 1 wherein the first connective member comprises a boss formed on a floor of the cavity, and the second connective member defines a recess for receiving the boss.

8. The device according to claim 4 wherein the block is flush with the first connective member after the disposal thereof in the cavity, wherein the aperture is a counterbore receiving a head of the bolt flush with the block.

* * * * *